Feb. 28, 1956   H. H. KOEPKE   2,736,530
HEAD COVER FOR TURBINES AND PUMPS
Filed Feb. 24, 1950   2 Sheets-Sheet 1

INVENTOR
HANS H. KOEPKE
BY   Toulmin & Toulmin
ATTORNEYS

Feb. 28, 1956 H. H. KOEPKE 2,736,530
HEAD COVER FOR TURBINES AND PUMPS
Filed Feb. 24, 1950 2 Sheets-Sheet 2
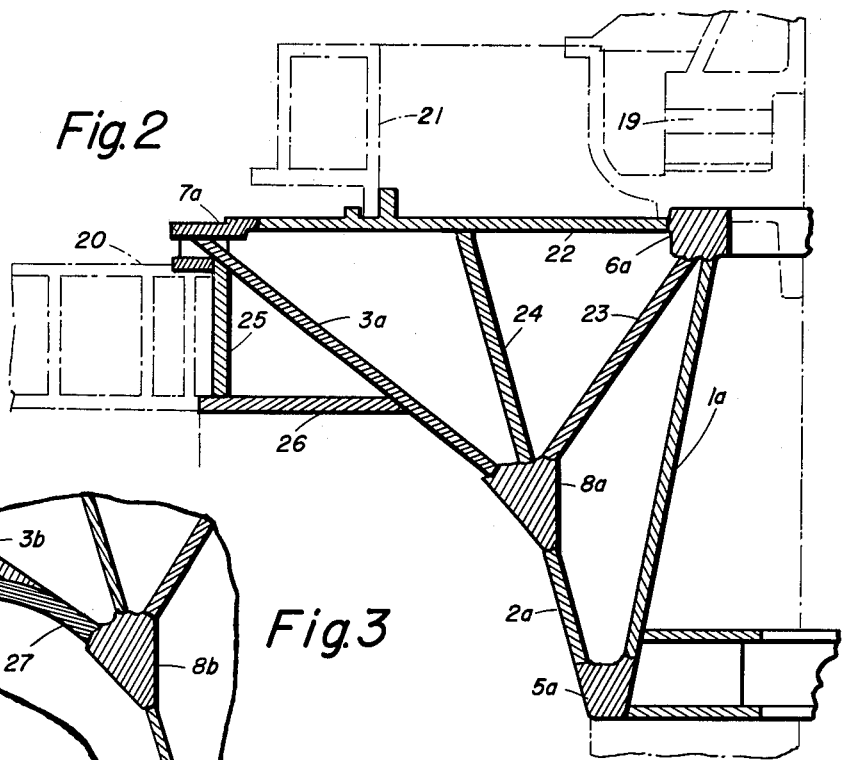
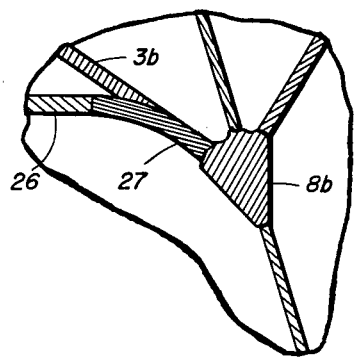
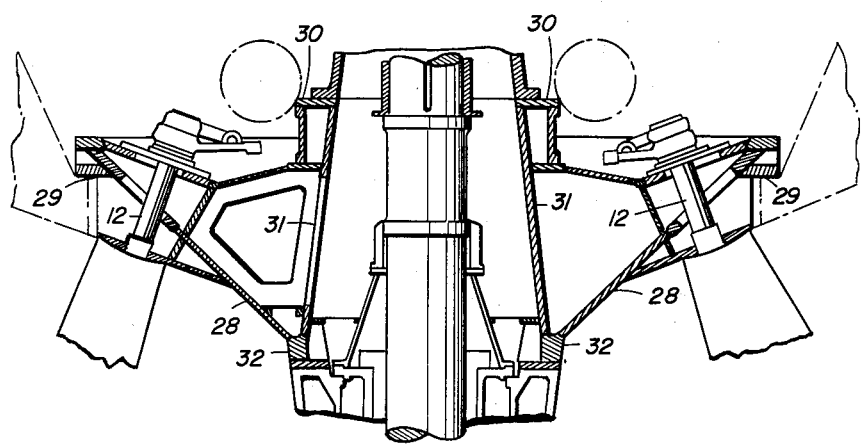
INVENTOR
HANS H. KOEPKE
BY Toulmin & Toulmin
ATTORNEYS

United States Patent Office 2,736,530
Patented Feb. 28, 1956

2,736,530

HEAD COVER FOR TURBINES AND PUMPS

Hans H. Koepke, Heidenheim, Germany, assignor to J. M. Voith, Heidenheim, Germany Application February 24, 1950, Serial No. 146,127

Claims priority, application Germany March 19, 1949

13 Claims. (Cl. 253—155)

The head cover of Kaplan turbines which forms the upper guiding surface for the water inlet immediately above the runner wheel and carries the control ring for the guiding wheel and frequently, also, the upper guiding bearings for the guide blades and, also, the thrust bearing for the runner wheel was heretofore practically always cast in one or more pieces. The cast pieces form a strong bearing outer skin which is reinforced by numerous ribs arranged in axial planes. For reasons connected with the art of casting, a certain minimum strength for the outer skin must be maintained. Generally, empiric values are used for the dimensioning of the head cover and outer skin. A particular disadvantage of this construction consists in that the provision of the ribs creates in the cast pieces great stresses which can be mastered only with great difficulties. In addition thereto, the low modulus of elasticity of the cast iron is disadvantageous, inasmuch as the calculation and selection of the dimensions is based primarily on the possible change of shape.

It has also been suggested to provide welded turbine head covers, but with these constructions the provision of ribs as known with the cast turbine head covers has been maintained. The welding on of the numerous ribs, however, creates in the turbine head cover such high stresses that it becomes necessary after the head cover has been welded to heat the same, which operation is possible only in very few shops which must be specifically fitted for such work. Also, in other respect the known welded construction of turbine head covers has not been satisfactory. The surface which contacts the water was shaped polygonally, which shape, from a hydraulic viewpoint, is inferior to a round shape.

It is an object of this invention to provide a turbine head cover which will overcome the above-mentioned drawbacks.

It is another object of this invention to provide a welded turbine head cover which will be free of reinforcement ribs of the type heretofore used, while, on the other hand, presenting a more rigid turbine head cover substantially free from any major stresses.

These and other objects and advantages of the invention will appear more clearly from the following specification in connection with the accompanying drawings in which:

Figure 2 is a section through a head cover constructed according to the present invention for use in connection with a Kaplan turbine provided with a cylindrical guiding apparatus.

Figure 3 is a section similar to that of Figure 2 through another embodiment of the invention.

Figure 4 is a section similar to that of Figure 1 of still another embodiment of the invention.

*General outline*

Figure 1:
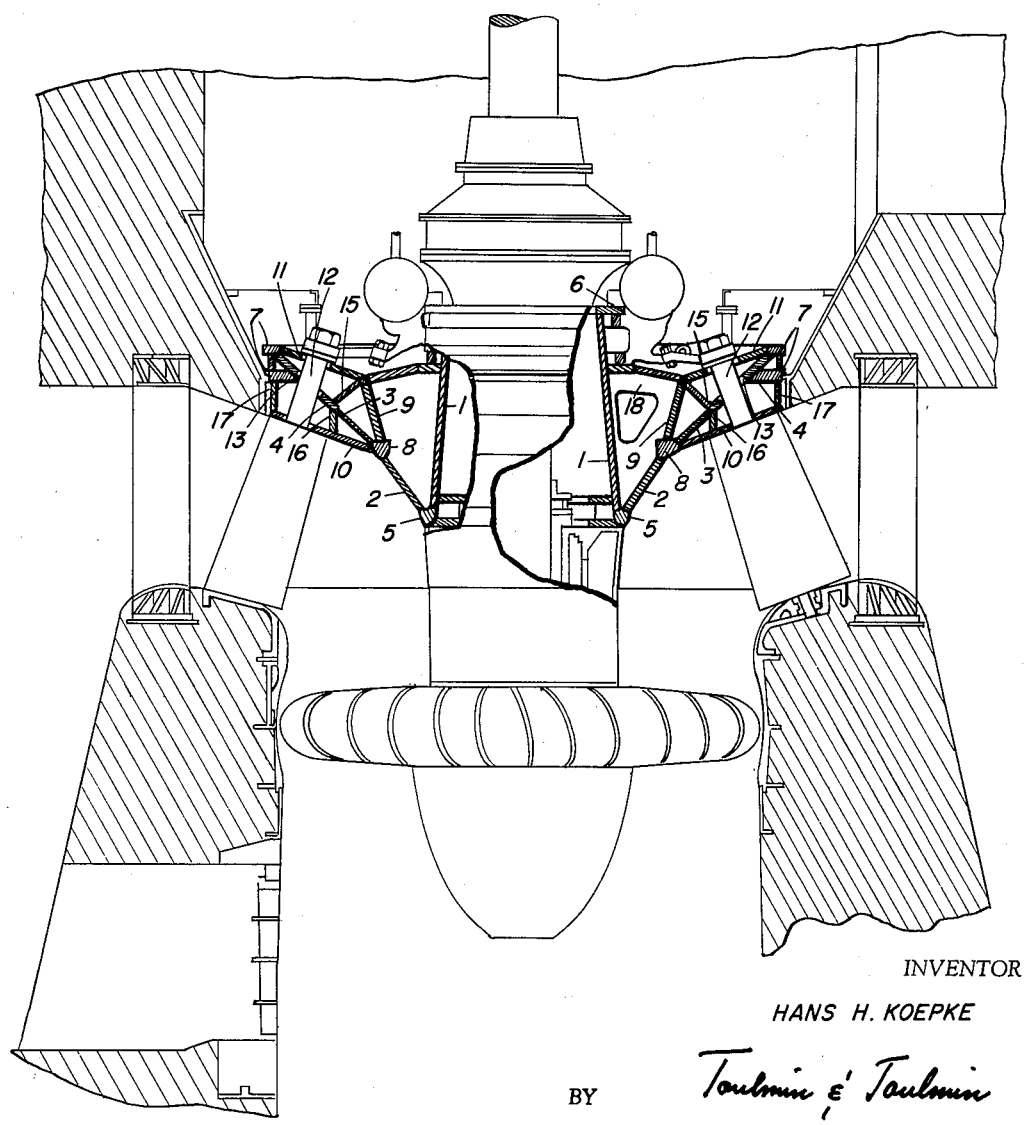
Figure 1 represents a section through a head cover according to the present invention for use in connection with a Cone-Kaplan turbine.

In contrast to the rib construction heretofore known, the turbine head cover according to the present invention, is composed exclusively or primarily of rotationally symmetrical bowl-shaped members in the form of frustrum covers or cylindrical covers. The construction is such that the rotationally symmetrical load is distributed evenly throughout the entire circumference upon the supporting flange.

According to a specific embodiment of the invention, the supporting parts of the turbine head cover are formed primarily by an inner frustrum cover slightly inclined toward the turbine shaft and spreading from the top toward the bottom, and further of an outer frustrum cover or distributor members connected to said first mentioned frustrum cover and widening from the bottom toward the top. Connected to these frustrum covers are additional conical or cylindrical bowls for stiffening and covering the said frustrum covers. In order to absorb the stresses in longitudinal direction, there are provided strong connecting rings at the joints of the individual bowls or bowl-shaped members. These connecting rings are so arranged that the intersecting lines of the forces intersect in the axis of gravity.

The outer bowl, in order to adapt itself to predetermined dimensions, may be composed of a lower somewhat steeper and an upper somewhat less inclined frustrum cover.

In order to obtain the desired shape of the lower surface of a turbine head cover which is contacted by water, there may be provided adjacent the bend of said frustrum covers and on the lower side of said bend a further frustrum cover shaped bowl. On the upper side of the said bend, there may be provided a bowl which spreads toward the upper end which supports the supporting ring for the outer ends of the upper pivots for the guiding blades. In order to adapt the head cover better to the curvature desired for the guiding of the water, a part of the head cover may consist of a curved metal sheet member.

*Structural arrangement*

Referring now to the drawing, and Figure 1 thereof in particular, the turbine head cover shown therein is composed primarily of the inner frustrum cover 1 and the outer frustrum cover consisting of the three members 2, 3 and 4. The inner and outer frustrum covers or frusto-conical members are welded at the lower ends to the common ring 5. Connected to the upper and lower ends of the two frustrum covers are the flanges for receiving the load and for journalling and connecting the head cover. The flange 6 receives the load which is transferred through the frustrum covers 1, 2, 3 and 4 upon the supporting or distributing flange 7 and from there through supporting blades upon the foundation. The connection between the two lower parts of the frustrum covers or distributor members 2, 3 and 4 is formed by a special ring 8 having adjacently connected thereto two further frustrum covers 9 and 10.

The frustrum cover 10 forms together with the lower part 2, the water guiding surface and forms with a further ring 11, the journal for the upper shaft 12 of the guide blade.

The bowl 4 contains openings 13 through which the shafts for the guide blades are passed with play. In order to make up for the reduced strength caused by these openings, the bowl 4 is made of thicker sheet metal than the bowl 3.

Additional supporting and connecting rings 14, 15, 16 and 17 complete the turbine head cover.

The reference numeral 18 designates flange parts required for the connection of the individual segments of the turbine head cover, if the latter, due to transport difficulties, has to be made up by a plurality of parts.

The bowls 15 and 16 form a water-tight closure of the outer head cover space through which the shaft of the guide blade passes, so that if leaks should occur at the passages for the shaft of the guide blade, the remaining head cover space will remain free from water.

Referring to Figure 2, this figure shows a structure according to which the upper bearings for the shafts of the guide blades are not located within the turbine head cover. Upon the turbine head cover there rests the thrust bearing 19, the load of which is transferred first via the turbine head cover upon the flange 20 and then from there via the supporting blades upon the foundation.

The turbine head cover is primarily composed of the cone-shaped bowls 1a, 2a and 3a, the connecting rings 5a, 6a, 7a and 8a, the upper closure plate 22 supporting the governing ring 21, the intermediate bowls 23 and 24, and the supplemental members 25 and 26.

The arrangement according to Figure 3 substantially corresponds to that of Figure 2. However, in contrast to the latter, the frustrum cover 3b is not directly adjacent the ring 8b. Instead, in order to improve the guiding of the water, a curved or bent member 27 is connected to the ring 8b, while the frustrum 3b is welded to the back of the member 27.

The arrangement illustrated in Figure 4 discloses a modified head cover wherein the distributing frustrum cover comprises a single frusto-conical member 28 with a distributor flange 29 secured directly to the frusto-conical member. The flange 29 is, in turn, supported upon the foundation in a suitable manner as shown in Figure 4. The weight of the turbine is borne by a top flange 30 which is secured to the top edge of an inner frustrum cover 31 joined at its lower edge to the lower edge of an outer frusto-conical member at 32.

It is, of course, understood that the present invention is by no means limited to the particular constructions shown in the drawing, but, also, comprises any modifications within the scope of the appended claims.

What I claim is:

1. A head cover for a hydraulic turbine comprising a circular top flange, a circular distributor flange having a diameter greater than said top flange and substantially concentric therewith, a bottom ring coaxial with said flanges and disposed intermediate and lower than said flanges, and frusto-conical bowl-shaped means interconnecting each of said flanges with said bottom ring.

2. A head cover for a hydraulic turbine comprising a circular top flange, a circular distributor flange having a diameter greater than said top flange and substantially concentric therewith, a bottom ring coaxial with said flanges and disposed intermediate and lower than said flanges, an intermediate ring coaxial with said flanges and said bottom ring and disposed intermediate said distributor flange and said bottom ring, and frusto-conical members interconnecting said top flange with said bottom ring, said intermediate ring with said bottom ring, and said distributor flange with said intermediate ring.

3. A head cover for a hydraulic turbine comprising a circular top flange, a circular distributor flange having a diameter greater than said top flange and substantially concentric therewith, a bottom ring coaxial with said flanges and disposed intermediate and lower than said flanges, an intermediate ring disposed intermediate said distributor flange and said bottom ring and aligned therewith, a turbine-supporting frusto-conical member interconnecting said top flange and said bottom ring, a first frusto-conical connecting ring interconnecting said intermediate ring and said bottom ring, a second frusto-conical connecting ring interconnecting said distributor flange and said intermediate ring, a water guide member coaxial with said flanges and rings and tapering inwardly from top to bottom, the bottom edge of said water guide member joined to said intermediate ring, and a cylindrical connecting ring interconnecting the top edge of said water guide member and said distributor flange.

4. A head cover for a hydraulic turbine, comprising a turbine-supporting frusto-conical member, said member tapering outwardly from top to bottom, a plurality of coaxial distributor frusto-conical members having their faces aligned to form a substantially straight surface and tapering inwardly from top to bottom, said members being joined together at their edges, and the bottom edge of the lowermost of said members joined to the bottom edge of said turbine supporting member.

5. A head cover for a hydraulic turbine, comprising a turbine supporting frusto-conical member, said member tapering outwardly from top to bottom, a distributor frusto-conical member tapering inwardly from top to bottom, said distributor member coaxial with said turbine supporting member, the bottom edges of both said members joined together, a water guide member coaxial with said members and tapering inwardly from top to bottom, the bottom edge of said water guide member joined to the face of said distributor member at a point substantially midway between top and bottom edges of said distributor member, and a cylindrical connecting ring interconnecting the top edge of said water guide member with the top edge of said distributor member.

6. A head cover for a hydraulic turbine comprising a turbine supporting frusto-conical member, said member tapering outwardly from top to bottom, a plurality of coaxial distributor frusto-conical members having their faces aligned to form a substantially straight surface and tapering inwardly from top to bottom, said members being joined together at their edges and the bottom edge of the lowermost of said members joined to the bottom edge of said turbine supporting member, a water guide member coaxial with said aforementioned members and tapering inwardly from top to bottom, the bottom edge of said water guide member joined to the top edge of the lowermost of said distributor members, and a cylindrical connecting ring joining the top edge of said water guide member and the top edge of the uppermost of said distributor members.

7. A head cover for a hydraulic turbine comprising a circular top flange, a circular distributor flange having a diameter greater than said top flange and substantially concentric therewith, a bottom ring coaxial with said flanges and disposed within said distributor flange and lower than said flanges, a frusto-conical member tapering inwardly from top to bottom connecting said distributor flange with said bottom ring, and means interconnecting said top flange with said bottom ring.

8. A head cover for a hydraulic turbine comprising a circular top flange; a circular distributor flange having a diameter greater than said top flange and substantially concentric therewith; a bottom ring coaxial with said flanges and disposed within said circular distributor flange and lower than said flanges; an intermediate ring coaxial with said flanges and said bottom ring and disposed intermediate said distributor flange and said bottom ring; and means interconnecting said top flange with said bottom ring, said intermediate ring with said bottom ring, and said distributor flange with said intermediate ring.

9. A head cover for a hydraulic turbine comprising a circular top flange; a circular distributor flange having a diameter greater than said top flange and substantially concentric therewith; a bottom ring coaxial with said flanges and disposed within said distributor flange and lower than said flanges; an intermediate ring coaxial with said flanges and said bottom ring and disposed intermediate said distributor flange and said bottom ring; means interconnecting said top flange with said bottom ring; and frusto-conical members interconnecting said intermediate ring with said bottom ring, and said distributor flange with said intermediate ring.

10. A head cover for a hydraulic turbine comprising a circular top flange, a circular distributor flange having a diameter greater than said top flange and substantially concentric therewith, a bottom ring coaxial with said flanges and disposed within said distributor flange and lower than said flanges, an intermediate ring disposed intermediate said distributor flange and said bottom ring and aligned therewith, a turbine-supporting member interconnecting said top flange and said bottom ring, a first frusto-conical connecting ring interconnecting said intermediate ring and said bottom ring, a second frusto-conical connecting ring interconnecting said distributor flange and said intermediate ring, a water-guide member coaxial with said flanges and rings and tapering inwardly from top to bottom, the bottom edge of said water guide member joined to said intermediate ring, and a substantially cylindrical connecting ring interconnecting the top edge of said water-guide member with said distributor flange.

11. A head cover for a hydraulic turbine comprising a turbine-supporting member, said member comprising a symmetrically-developed closed surface, a plurality of coaxial distributor frusto-conical members having their faces aligned to form a substantially straight surface and tapering inwardly from top to bottom, said distributor members being joined together at adjoining edges, and the bottom edge of the lowermost of said distributor members joined to the bottom edge of said turbine-supporting member.

12. A head cover for a hydraulic turbine comprising a turbine-supporting member, said member comprising a symmetrically-developed closed surface, a distributor frusto-conical member tapering inwardly from top to bottom, said distributor member coaxial with said turbine-supporting member, the bottom edges of both said members joined together, a water-guide member coaxial with said members and tapering inwardly from top to bottom, the bottom edge of said water-guide member joined to the face of said distributor member at a point substantially midway between the top and bottom edges of said distributor member, and a substantially cylindrical connecting ring interconnecting the top edge of said water-guide member with the top edge of said distributor member.

13. A head cover for a hydraulic turbine comprising a turbine-supporting member, said member comprising a symmetrically-developed closed surface, a plurality of coaxial distributor frusto-conical members having their faces aligned to form a substantially straight surface and tapering inwardly from top to bottom, said distributor members being joined together at their adjoining edges and the bottom edge of the lowermost of said members joined to the bottom edge of said turbine-supporting member, a water-guide member coaxial with said aforementioned members and tapering inwardly from top to bottom, the bottom edge of said water-guide member joined to the top edge of the lowermost of said distributor members, and a substantially cylindrical connecting ring joining the top edge of said water-guide member and the top edge of the uppermost of said distributor members.

References Cited in the file of this patent

UNITED STATES PATENTS

| | | |
|---|---|---|
| 1,641,362 | White | Sept. 6, 1927 |
| 1,779,191 | Sharp | Oct. 21, 1930 |
| 1,987,082 | Sharp | Jan. 8, 1935 |
| 2,077,883 | Hand | Apr. 20, 1937 |
| 2,466,827 | Roth | Apr. 12, 1949 |
| 2,544,490 | Curley | Mar. 6, 1951 |

FOREIGN PATENTS

| | | |
|---|---|---|
| 754,399 | France | Nov. 6, 1933 |